Oct. 13, 1953   J. C. TRAVILLA   2,655,117
RAILWAY VEHICLE BODY AND TRUCK CENTRAL BEARING
Filed Oct. 10, 1949

INVENTOR
James C. Travilla
By Rodney Bedell
Atty.

Patented Oct. 13, 1953

2,655,117

UNITED STATES PATENT OFFICE 2,655,117

RAILWAY VEHICLE BODY AND TRUCK CENTRAL BEARING

James C. Travilla, University City, Mo., assignor to General Steel Castings Corporation, Granite City, Ill., a corporation of Delaware Application October 10, 1949, Serial No. 120,587

6 Claims. (Cl. 105—199)

The invention relates to railway rolling stock and more particularly to the assembly of a vehicle truck and body of the type in which the body is solely supported on the truck through a central bearing structure which provides a swivel connection between the truck and body.

In a vehicle with trucks at opposite ends of the body, each having the usual swivel center plate connection to the body, the forward wheel and axle assembly of each truck tends to move laterally until the flange of one wheel engages the rail when the wheel and axle assembly is deflected towards the opposite rail until the latter is engaged by the corresponding wheel flange and a deflection in the opposite direction follows. These alternate thrusts upon the truck wheels produce "nosing" or "shimmying" which tends to cause the adjacent portion of the vehicle body to move back and forth laterally resulting in undesirable transverse action which is particularly objectionable in passenger train operation. If the nosing of the truck at one end of the vehicle is in phase with the nosing of the truck at the other end of the vehicle, undesirable side sway of the vehicle body occurs and if out of phase with the nosing of the truck at the other end of the vehicle, nosing of the vehicle body occurs and in both cases undesirable riding qualities are accentuated.

An object of the present invention is to reduce or eliminate the back and forth swinging of the truck about its central bearing which initiates the undesirable nosing or shimmying or side swaying referred to above.

Another object of the invention is to eliminate the need for the usual type of side bearings which add to the first cost and to maintenance costs of the truck.

Another object of the invention is to provide a central bearing support which will not require lubrication but because of its design will not have excessive wear.

The invention consists in the provision of a central bearing structure which offers frictional resistance to relative rotation of the truck and body sufficient to substantially prevent swiveling during all normal uses of the vehicle except as positively induced by movement of the vehicle over curved track.

In the accompanying drawings illustrating a selected embodiment of the invention:

Figure 1:
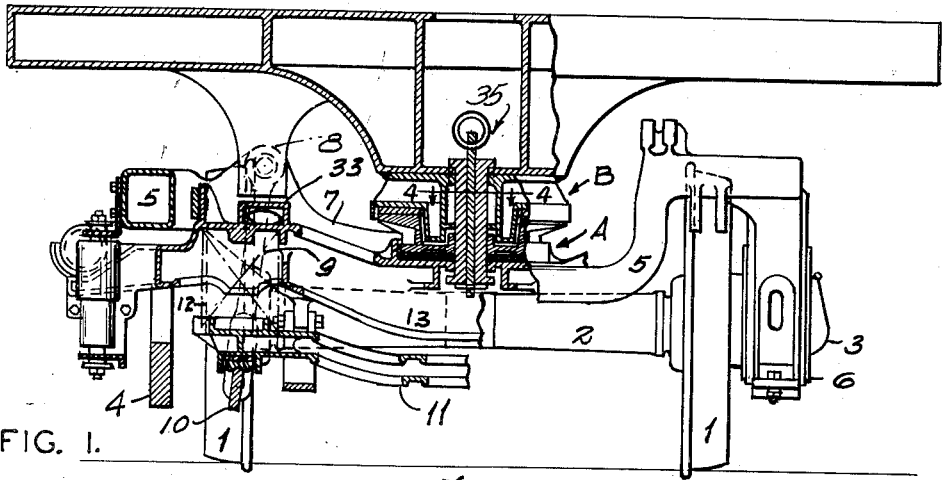
Figure 1 is in part an end view of a railway truck and in part a vertical section on the transverse center line of the truck, the adjacent portion of the vehicle body underframe being indicated also.

The truck shown in Figure 1 includes wheels 1, axle 2, journal boxes 3 which mount equalizers 4. The truck frame 5 is spring-supported from equalizers 4 in the usual manner and includes pedestals 6, which slidably receive the journal boxes, and transverse transoms 7 having brackets 8 from which swing hangers 9 support cross bars 10 which carry a spring plank 11 on which the bolster springs 12 are mounted.

Figure 3:
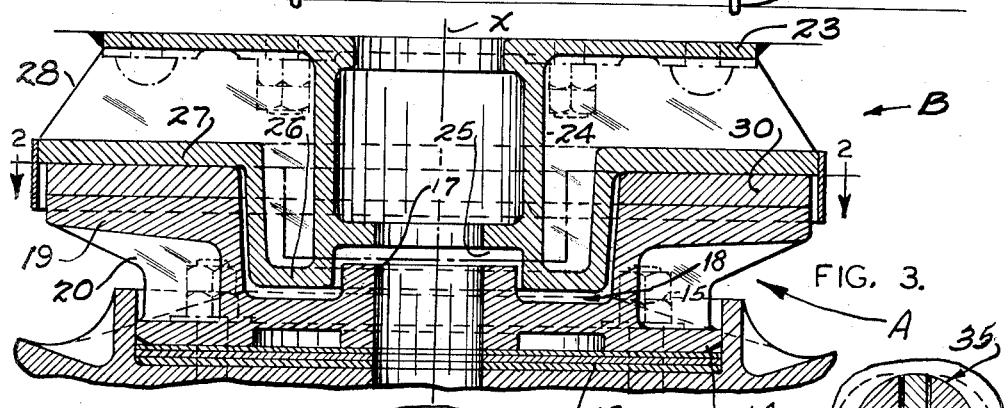
Figure 3 is a vertical transverse section taken on the line 3—3 of Figure 2 and also showing the associated body central bearing.
Figure 2:
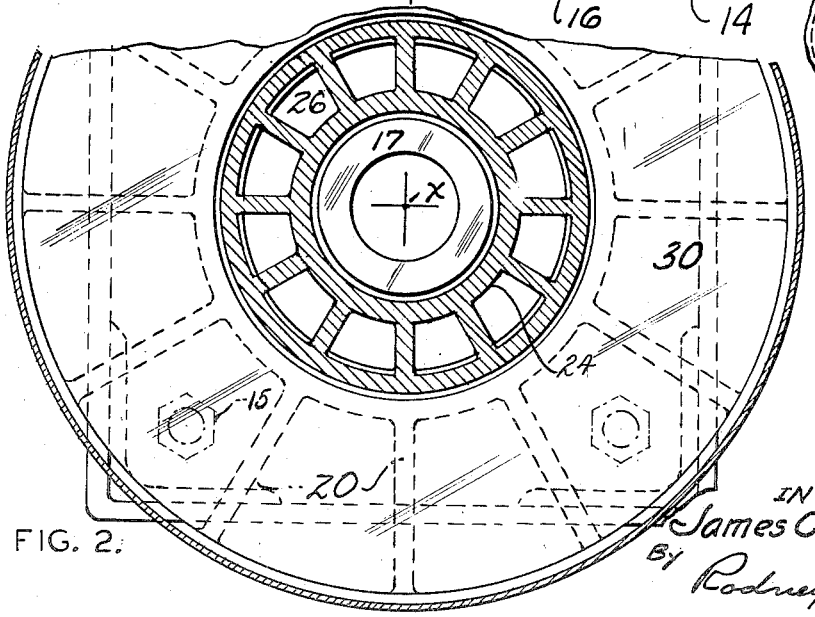
Figure 2 is a top view of the major portion of the truck central bearing portions being broken away to permit the drawings to be made upon a larger scale.

A bolster 13 is provided with a central bearing A as detailed in Figures 2 and 3 which includes a base 14 received in an upwardly facing recess in the bolster and secured to the bolster by bolts 15, either directly or with an adjustable mounting consisting of shims 16. The central bearing has a central upstanding annular boss 17 surrounded by an annular recess 18 which, in turn, is surrounded by a load-supporting rim 19 projecting radially beyond the periphery of base 14 and braced therefrom by ribs 20 extending outwardly and radially of the base and positioned between bolts 15.

A body central bearing B includes a base 23, a cylindrical body 24 terminating in a downwardly facing central recess 25 surrounded by an annular boss 26 which, in turn, is surrounded by a load-transmitting rim 27 braced from base 23 by ribs 28 extending outwardly and radially from base 23 and between which are bolts passing through the base and securing it to the body bolster.

An annular liner 30 lies between rims 19 and 27. Preferably liner 30 will be of non-metallic material and with central bearings A and B of the usual cast metal construction the coefficient of friction offered by liner 30 between bearings A and B will be higher than lubricated center plates of the usual type. The vertically opposing faces of bosses 17 and 26 and recesses 25 and 18 will be spaced from each other but the sides of these bosses and recesses form opposing shoulders holding central bearings A and B against substantial relative movement transversely of the central bearing axis X although limited clearance between these shoulders facilitate manufacture and assembly.

With this arrangement, the entire load will be transmitted from central bearing B to central bearing A through the annular rims 19 and 27 and the friction liner 30.

The internested central boss and recess portions of the central bearing correspond in diameter to the usual center plate structure in which these portions carry the vertical load. In the present central bearing structure, these internested central portions do not carry the vertical load but the latter is transmitted through the annular rims which extend radially from the internested central portions and have an outside diameter of approximately twice that of the internested central portions, the area of the load-transmitting rims 19, 27 being about five times that of the vertical load-transmitting surface of the usual center plate structure. This difference in area, in addition to the provision of friction means between the relatively rotating load-transmitting surfaces disposed radially outwardly of the area of the usual load-transmitting center plates, results in such increased resistance to the swiveling of the truck and body as will materially oppose the forces which will tend to cause shimmying or nosing.

In addition to the intentional provision of a higher degree of frictional resistance between the central bearing than the usual lubricated center plate structure, the departure from the usual construction may be expressed in terms of the relation between the outside diameter of the central bearing structure and the distance between the side bearings 33 at opposite sides of the truck. The outside diameter of the central bearing structure is about one-half the distance between the side bearings. The central bearing structure stably supports the vehicle body and the truck independently of side bearings 33 and, instead of having the usual type side bearings 33 functioning as bearings on body and truck, side safety stops are provided to prevent excessive tilting in case of accident or other unusual occurrences and these stops are spaced apart vertically and do not transmit the load normally but are provided merely as a safety measure to function when there is excessive tilting of the body on the truck transversely of the vehicle.

With this arrangement, the frictional resistance to the rotation of the central bearing members will increase automatically with the central bearing load. The greatly increased area of the load-transmitting surface, together with the liner 30 of brake lining material, will substantially reduce or eliminate wear on the central bearing members and the resulting maintenance expense of the central bearing structure.

This arrangement attains the objects stated in the introductory portion of the specification by substituting for the conventional center plate and side bearings a central bearing structure having a substantially larger diameter than the usual center plate and offers substantially greater frictional resistance to the rotation of the truck and body than the usual center plate and side bearings and also provides a sole, stable, and non-rocking or non-tilting support of the body on the truck as distinguished from a slightly rocking support provided by the conventional plate in combination with side bearings having vertical movement relative to the center plate which, during most of the vehicle travel, results in the side bearing at one side or the other of the truck partially supporting the vehicle body, the body tilting first to one side and then to the other side except when the vehicle is traveling on curved track and centrifugal force is sufficient to maintain contact between the side bearings at the outer side of the curve.

Figure 4:
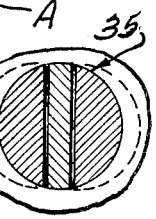
Figure 4 is a detailed horizontal section on the line 4—4 of Figure 1.

An interlocking center pin device is indicated at 35 and shown in section in Figure 4 but this showing is illustrative only and it will be understood that other center pin arrangements may be used and the other details of the center plate structure may be varied without departing from the spirit of the invention. The exclusive use of those modifications coming within the scope of the claims is contemplated.

What is claimed is:

1. In a railway vehicle including a vehicle body and a swivel truck, a central bearing structure for supporting the body on the truck comprising members on the body and truck, respectively, having internesting center parts with upright cylinder-like portions opposing each other laterally for holding the members against relative lateral movement, said members being fixed on the vehicle body and truck, respectively, and including cooperating horizontal annular bearings facing downwardly and upwardly respectively and extending radially outwardly from said upright cylinder-like portions and supporting the entire vertical load of the body member and forming a non-rocking support of the body member on the truck member during all normal uses of the vehicle, said bearings including friction means substantially preventing swiveling of the truck with respect to the body during all normal uses of the vehicle except as positively induced by movement of the vehicle over curved track.

2. In a railway vehicle, a truck and a body including a central bearing structure by which the truck supports the body and by which the body and truck swivel on each other, said structure comprising a member fixed on the truck and a member fixed on the body, said members having internesting cylindrical center portions forming a recess and projection, respectively, with upright sides to hold the members against relative lateral movement, a king pin securing said members against separation, said members having opposing horizontal bearing elements extending outwardly from said center portions a sufficient distance to preclude rocking of said members on each other during all normal uses of the vehicle, said elements having bearing surfaces of sufficient areas to substantially prevent swiveling of the truck with respect to the body except as positively induced by movement of the vehicle over curved track, opposing safety stops on the truck and body respectively, spaced transversely of the vehicle outwardly from said bearing surfaces and spaced vertically from each other to clear each other during all normal uses of the vehicle but positioned close enough to each other to limit tilting of the body on the truck in the event of derailment.

3. A railway vehicle central bearing structure for mounting one end of a vehicle body upon a truck, comprising a lower member for application to a railway truck part and an upper member for application to a railway vehicle body, said members including center portions with substantially vertical surfaces opposing each other to hold said members against substantial relative lateral movement but curved about an upright central axis to accommodate their pivotal movement in a horizontal plane, said members including opposing horizontal bearings of sufficient diameter to afford a sole stable non-rocking support for one end of a vehicle body relative to said truck part, said bearings extending radially outwardly from said center portions and comprising opposing horizontal surfaces having frictional sliding contact with each other and of sufficient area to substantially prevent relative rotation of the members under the load thereon during all normal uses of the vehicle, except when traveling over curved track, the upper one of said bearing members having rigid portions disposed and arranged for non-rocking support of a railway vehicle body part.

4. A railway vehicle central bearing structure as described in claim 3 which includes a renewable liner of stiff material not substantially distortable in normal use of the structure and positioned between the opposing horizontal bearings and affording the frictional sliding contact between the horizontal bearings.

5. A central bearing structure for supporting a railway vehicle body upon a swiveling truck, comprising a lower member and an upper member having internested central portions, with substantially upright opposing circular webs having the same diameter as the conventional center plate bearing surface, forming a pivotal assembly of the members and of sufficient diameter to adequately resist heavy transverse shocks transmitted between a railway vehicle body and truck during normal operation of the vehicle, there being horizontal bearings on said members extending radially outwardly from said central portions a sufficient distance to preclude rocking of the members on each other during all normal uses of a vehicle to which they are applied and providing opposing surfaces frictionally slidable on each other and having bearing areas at least twice as great as the area of the supporting surface of the conventional center plate and substantially preventing swiveling of the members during all normal uses of the vehicle except when positively rotated relative to each other about the axis of said webs by movement of the vehicle over curved track.

6. In combination, a railway vehicle truck bolster and a central bearing structure for mounting one end of a railway vehicle body upon the bolster, said structure including a member rigid with the bolster and a member fitting thereover with elements arranged for rigid support of a railway vehicle body, said members including center portions with substantially vertical surfaces opposing each other to hold said members against substantial relative lateral movement and curved about a central vertical axis to accommodate their relative pivotal movement in a horizontal plane, said members including opposing horizontal bearings of sufficient width to afford a sole stable non-rocking support for one end of a vehicle body relative to the bolster, said horizontal bearings extending radially outwardly from said center portions and providing frictional sliding contact with each other and having an area sufficient to hold the members against relative rotation under the load thereon during all normal uses of the vehicle except when traveling over curved track.

JAMES C. TRAVILLA.

References Cited in the file of this patent

UNITED STATES PATENTS

| Number | Name | Date |
| --- | --- | --- |
| 1,237,166 | Burrmann | Aug. 14, 1917 |
| 1,486,143 | Hovey | Mar. 11, 1924 |
| 2,128,281 | Blomberg | Aug. 30, 1938 |
| 2,514,034 | Dean | July 4, 1950 |

FOREIGN PATENTS

| Number | Country | Date |
| --- | --- | --- |
| 1,435 of 1873 | Great Britain | Apr. 21, 1873 |